(12) United States Patent
Kutal et al.

(10) Patent No.: US 6,911,485 B1
(45) Date of Patent: Jun. 28, 2005

(54) ANIONIC AND LEWIS BASE PHOTOPOLYMERIZATION PROCESS AND ITS USE FOR MAKING OPTICAL ARTICLES

(75) Inventors: Charles R. Kutal, Athens, GA (US); Sirisoma Wanigatunga, Largo, FL (US); Gabriel Keita, Oldsmar, FL (US); Yassin Turshani, Largo, FL (US)

(73) Assignees: The University of Georgia Research Foundation, Inc., Athens, GA (US); Essilor International Campagnie Generale D'Optique, Charenton Cedex (FR)

( * ) Notice: Subject to any disclaimer, the term of this patent is extended or adjusted under 35 U.S.C. 154(b) by 172 days.

(21) Appl. No.: 10/126,572

(22) Filed: Apr. 19, 2002

(51) Int. Cl.[7] .............................. C08F 2/48; C08F 4/52; C08F 4/78; G03C 1/735; G03F 7/029
(52) U.S. Cl. ............................. 522/49; 522/57; 522/62; 522/65; 522/66; 522/174; 522/180; 522/173; 522/182
(58) Field of Search ............................. 522/66, 29, 65, 522/28, 174, 180, 49, 57, 62, 173, 182; 264/496, 2.1, 1.36–1.38

(56) References Cited

U.S. PATENT DOCUMENTS

| | | | | |
|---|---|---|---|---|
| 4,354,024 A | * | 10/1982 | Johnson et al. | 544/181 |
| 4,355,161 A | * | 10/1982 | Johnson et al. | 544/181 |
| 4,727,123 A | * | 2/1988 | Weinert et al. | 526/124.1 |
| 4,740,577 A | * | 4/1988 | DeVoe et al. | 528/51 |
| 4,954,414 A | * | 9/1990 | Adair et al. | 430/138 |
| 5,089,536 A | * | 2/1992 | Palazzotto | 522/16 |
| 5,415,984 A | * | 5/1995 | Komamura et al. | 430/495.1 |
| 5,439,863 A | * | 8/1995 | Bottcher et al. | 502/152 |
| 5,468,785 A | * | 11/1995 | Greuel et al. | 522/63 |
| 5,476,755 A | * | 12/1995 | Nakayama et al. | 430/336 |
| 5,556,705 A | * | 9/1996 | Bottcher et al. | 428/413 |
| 5,606,085 A | * | 2/1997 | Bell et al. | 556/57 |
| 5,652,280 A | | 7/1997 | Kutal | |
| 5,691,113 A | | 11/1997 | Kutal | |
| 5,728,750 A | * | 3/1998 | Schwalm et al. | 522/173 |
| 5,739,367 A | * | 4/1998 | Carr et al. | 556/147 |
| 5,776,997 A | * | 7/1998 | Hafner et al. | 522/65 |
| 5,877,230 A | | 3/1999 | Kutal | |
| 5,973,098 A | | 10/1999 | Keita et al. | |
| 6,127,445 A | | 10/2000 | Kutal et al. | |

FOREIGN PATENT DOCUMENTS

WO      WO 93/10483      5/1993

OTHER PUBLICATIONS

International Search Report, PCT/US03/12069.

* cited by examiner

*Primary Examiner*—Susan Berman
(74) *Attorney, Agent, or Firm*—Thomas, Kayden, Horstemeyer & Risley, LLP

(57) ABSTRACT

The invention relates to a process for polymerising a monomer, polymerizing and/or crosslinking a oligomer, or crosslinking a polymer or copolymer, said monomer, oligomer, polymer and copolymer being selected among precursor monomers, urethane, thiourethane and episulfide oligomers, and urethane, thiourethane and episulfide polymers and copolymers, which comprises:
(a) adding to precursor monomers or oligomers or polymers or copolymers an effective amount of at least one complex of Co, Mo or W which under irradiation conditions photochemically reacts to release at least one anionically charged nucleophile or uncharged Lewis base; and
(b) irridiating the mixture of (a) to release the at least one anionically charged nucleophile or uncharged Lewis base to initiate polymerisation and/or crosslinking of the monomer, oligomer, polymer or copolymer.

5 Claims, 6 Drawing Sheets

ANIONIC AND LEWIS BASE PHOTOPOLYMERIZATION PROCESS AND ITS USE FOR MAKING OPTICAL ARTICLES

BACKGROUND OF THE INVENTION

1. Field of the Invention

The present invention concerns a fast photopolymerization and/or curing process for making urethane, thiourethane and episulfide polymers and copolymers.

The invention also concerns a process for making an optical article, in particular an ophthalmic lens, through a fast photopolymerization and/or curing process.

2. Description of Related Art

Various polymer materials have been used for making optical lenses such as ophthalmic lenses. These materials include polymers and copolymers of (meth)acrylates, urethanes, thiourethanes, epoxides and episulfides.

Polymerization of the starting monomers and oligomers or crosslinking of the oligomers and polymers have been typically carried out using free radical thermal initiators or free radical and cationic photoinitiators.

Anionic photopolymerization and/or curing of certain monomers in the presence of an anionic photoinitiator is also known.

U.S. Pat. No. 5,652,280 discloses anionic photopolymerization and/or curing of ethylene, 1,3-dienes, styrene, (meth)acrylates and (meth)acrylonitriles, in the presence of an anionic photoinitiator. The photoinitiator is an inorganic transition metal complex that releases a nucleophilic anion when irradiated with visible or ultra-violet radiation. The inorganic complexes used in U.S. Pat. No. 5,652,280 are Cr complexes, Pt complexes and cyclopentadienyl Fe or Ru complexes. These anionic photoinitiators were used for polymerizing ethyl α-cyanoacrylate.

U.S. Pat. No. 5,691,113 discloses a process for polymerizing a monomer or oligomer or crosslinking an oligomer or polymer, in the absence of protic solvents, comprising irradiating a mixture of a monomer, oligomer, or polymer in the presence of an inorganic transition metal complex. The complex is selected from trans-$[Cr(NH_3)_2(NCS)_4]^{31}$, trans-$[Cr(en)_2(NCS)_2]^+$, trans-$Co(en)_2Cl_2^+$, trans-$Cr(cyclam)Cl_2^+$, trans-$Cr(cyclam)(NSC)_2^+$, trans-$Co(cyclam)Cl_2^+$, trans-$Cr(R)_2(OH)_2^+$, trans-$Cr(R)_2(OH)H_2O_2^+$, trans-$Cr(R)_2(OH)Cl^+$, and $Pb(OH)_6^{2-}$ wherein R is ethylenediamine and 1,3-propylenediamine. The examples describe anionic photopolymerization of ethyl α-cyanoacrylate in the presence of some of the above photoinitiators.

U.S. Pat. No. 5,877,230 discloses anionic photopolymerization and/or crosslinking of the same monomers, oligomers and polymers, in particular ethyl α-cyanoacrylate, than the above mentioned patents using cyclopentadienyl metallo complexes as photoinitiators.

U.S. Pat. No. 5,973,098 discloses a thermal fast curing process of polyurethane lenses using a thiocyanate anion to activate the polymerization of the starting monomers. No photopolymerization is mentioned.

The entire contents of each of the above-cited patents are incorporated herein by reference.

SUMMARY OF THE INVENTION

It has now been found that it is possible to rapidly polymerize and/or crosslink urethane, thiourethane and episulfide polymers and copolymers by irradiating corresponding monomers, oligomers and polymers in the presence of at least one Co, Mo, or W complex that, under irradiation conditions, photochemically reacts to release an anionically charged nucleophile or an uncharged Lewis base, which initiates the polymerization and/or crosslinking reaction.

More specifically, the present invention relates to a process for polymerizing a monomer, polymerizing and/or crosslinking an oligomer, or crosslinking a polymer or copolymer, said monomer, oligomer, polymer and copolymer being selected from among precursor monomers, urethane, thiourethane and episulfide oligomers, and urethane, thiourethane and episulfide polymers and copolymers, which comprises:

(a) adding to the precursor monomers or oligomers or polymers or copolymers an effective amount of at least one complex of Co, Mo or W which under irradiation conditions photochemically reacts to release at least one anionically charged nucleophile or uncharged Lewis base; and (b) irradiating the mixture of (a) to release the at least one anionically charged nucleophile or uncharged Lewis base to initiate polymerisation and/or crosslinking of the monomer, oligomer, polymer or copolymer.

The preferred anionically charged nucleophiles are thiocyanate, acetate, benzoate, enolate, thiolate and alkoxylate anions, in particular thiocyanate, acetate, benzoate and alkoxylate anions.

The invention also concerns a process for making a (meth)acrylate, urethane, thiourethane or episulfide polymer or copolymer based optical article, such as an ophthalmic lens, which comprises:

(a) filling a mold cavity with a mixture of polymer or copolymer precursor monomers and an effective amount of at least one complex of Co, Mo or W which under irradiation conditions photochemically reacts to release at least one anionically charged nucleophile or uncharged Lewis base;

(b) irradiating the mixture to release the at least one anionically charged nucleophile or uncharged Lewis base to initiate polymerization and polymerize the monomers; and (c) recovering the resulting optical article.

The invention will be more clearly understood by reference to the accompanying drawings and detailed description, which are not intended to limit the scope of the claims in any way.

DETAILED DESCRIPTION OF THE INVENTION

Figure 1:
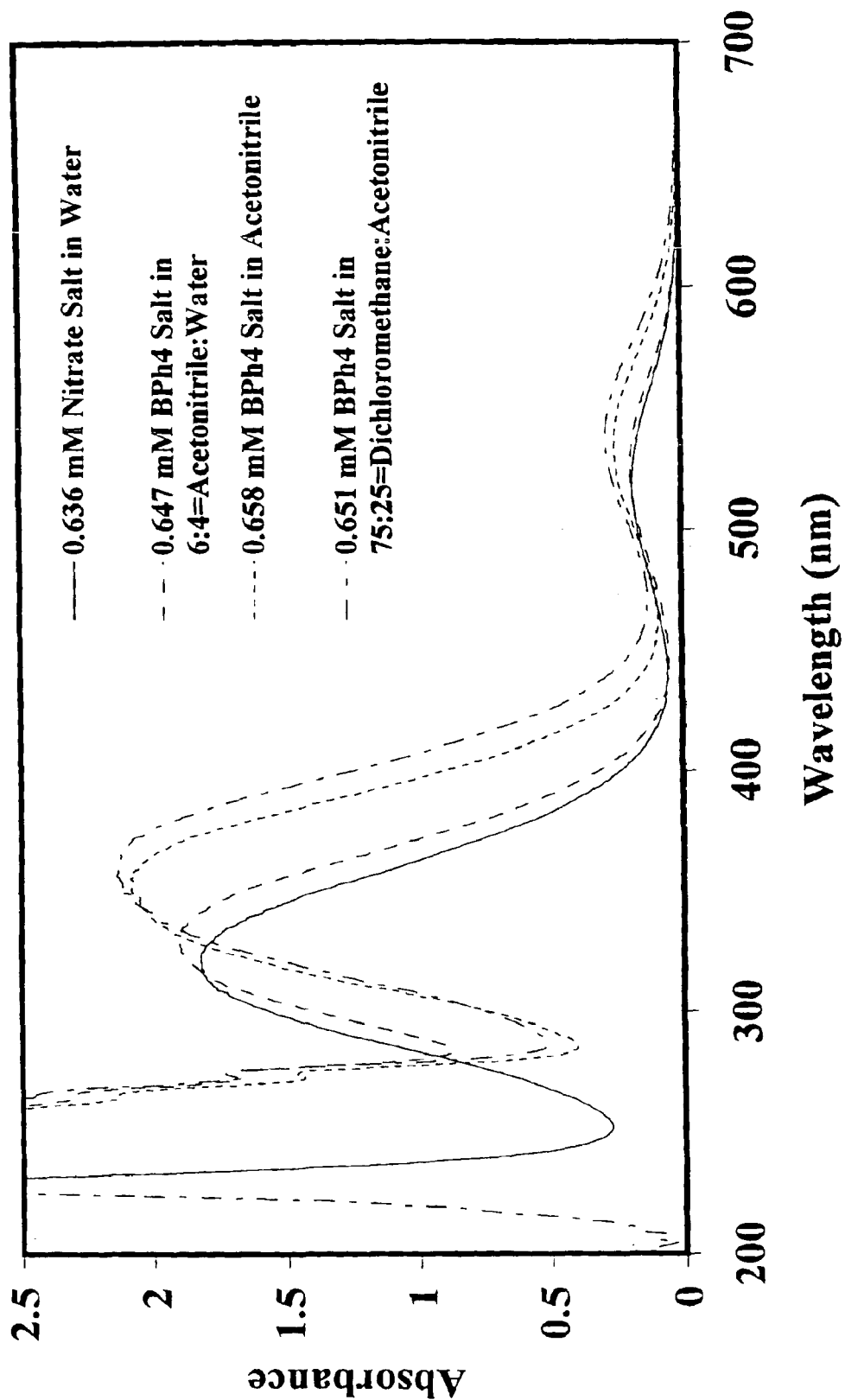
FIG. 1 is a graph showing the room-temperature electronic absorption spectra of $[Co(NH_3)_4(NCS)_2]^+$ in several solvents.

As used herein, the terms "anionic photopolymerization" and "anionic photoinitiator" include polymerization initiated by an uncharged Lewis base that is photochemically released, and the complexes that release the uncharged Lewis base, respectively, as well as photopolymerization resulting from, and photoinitiators that release, anions.

The metal complexes useful as photopolymerization initiators in the present invention are Co, Mo and W complexes, and in particular those which upon irradiation release thiocyanate, acetate, benzoate, thiolate or alkoxylate anions.

Suitable metal complexes include:

[Co(NH$_3$)$_4$(SCN)$_2$] [BPh$_4$]
[Co(en)$_2$(SCN)$_2$] [BPh$_4$]
[Co(Py)$_4$(SCN)$_2$] [BPh]
[Co(NH$_3$)$_2$(SCN)$_4$] [K]
[Co(NH$_3$)$_5$(CH$_3$COO)] [BPh$_4$]$_2$
[Co(NH$_3$)$_4$(CH$_3$COO)$_2$] [BPh$_4$]
[Co(NH$_3$)$_5$(C$_6$H$_5$COO)] [BPh$_4$]$_2$
[Co(NH$_3$)$_4$(C$_6$H$_5$COO)$_2$] [BPh$_4$]
[Co(NH$_3$)$_5$(SR)] [BPh$_4$]
[Co(NH$_3$)$_4$(SR)$_2$] [BPh$_4$]
[Co(NH$_3$)$_5$(OR)] [BPh$_4$]
[Co(NH$_3$)$_4$(OR)$_2$] [BPh$_4$]
[Mo(CO)$_5$(DABCO)], where R is an alkyl group, preferably a C$_1$–C$_4$ alkyl group.

Particularly suitable complexes are [Co(NH$_3$)$_4$(SCN)$_2$] [BPh$_4$], [Co(NH$_3$)$_5$(CH$_3$COO)] [BPh$_4$]$^2$, [Co(NH$_3$)$_4$(CH$_3$COO)$_2$] [BPh$_4$], and [Mo(CO)$_5$(DABCO)].

DABCO is 1,4-diazabicyclo[2,2,2] octane.
DMCA is dimethylcyclohexylamine.

The monomers polymerizable through the process of the present invention are those classically used for making poly(meth)acrylates, polyurethanes, polythiourethanes and episulfide polymers and copolymers.

As well known in the art, polyurethanes are made by polymerizing a polyisocyanate, generally a diisocyanate, with a polyol, generally a diol.

The polyisocyanate can be any polyisocyanate compound having "free", "blocked" or "partially blocked", "modified" or "unmodified" isocyanate groups or mixtures of "modified" and "unmodified" groups.

The term "modified" means that the polyisocyanates have been changed in a known manner to introduce therein biurea, urea, carbodiimide, urethane or isocyanurate groups.

The polyisocyanates can be aliphatic, aromatic, cycloaliphatic, heterocyclic or a mixture thereof.

Preferably, the polyisocyanates are diisocyanates.

Among the preferred diisocyanates are toluene-2,4-diisocyanate, toluene-2,6-diisocyanate, diphenylmethane-4,4'-diisocyanate, diphenylmethane-2,4'diisocyanate, paraphenylene diisocyanate, biphenylmethane diisocyanate, 3,3'-dimethyl-4,4'-diphenylene diisocyanate, tetramethylene-1,4-diisocyanate, hexarnethylene-1,6-diisocyanate, 2,2,4-trimethylhexane-1,6-diisocyanate, lysine methyl ester diisocyanate, bis(isocyanatoethyl) fumarate, isophorone diisocyanate, ethylene diisocyanate, dodecane-1,12-diisocyanate, cyclobutane-1,3-diisocyanate, cyclohexane-1,3-diisocyanate, cyclohexane-1,4-diisocyanate, methylcyclohexyl diisocyanate, hexahydrotoluene-2,4-disocyanate, hexahydrotoluene-2,6-diisocyanate, hexahydrophenylene-1,3-diisocyanate, hexahydro-phenylene-1,4-diisocyanate, perhydrodiphenylmethane-2,4'-diisocyanate, perhydrodiphenylmethane-4,4'-diisocyanate, and mixtures thereof The particularly preferred diisocyanates are hexarnethylene-1,6-diisocyanate, isophorone diisocyanate, ethylene diisocyanate, dodecane-1,12-diisocyanate, cyclohexane-1,3-diisocyanate, and the diisocyanates of formulas:

(I)

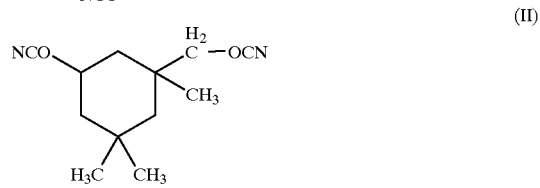

(II)

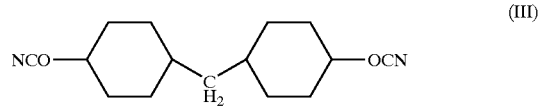

(III)

The polyols, i.e diols, triols, etc., can be aliphatic polyols, such as C$_2$–C$_{10}$ aliphatic diols, polyester polyols, polyether polyols, polycarbonate polyols amide group containing polyols, polyacrylic polyols, epoxypolyols, polyvinyl polyols, urethane polyols and mixtures thereof Particularly suitable types of polyols are polyacrylic polyols and polyether polyols.

Examples of suitable polyols are pentaerythritol, trimethylolpropane, di(trimethylolpropane) dimethylolpropionic acid, ethyleneglycol, propyleneglycol, 1,2-butenediol, 1,4-butenediol, 1,3-butenediol, 2,2,4-trimethyl-1,3-pentanediol, 1,5-pentanediol, 2,4-pentanediol, 1,6-hexanediol, 2,5-hexanediol, 2-methyl-1,3-pentanediol, 2,4-heptanediol, 2-ethyl-1,3-hexaned 2,2-dimethyl-1,3-propanediol, 1,4-cyclohexanediol, 2,2-dimethyl-3-hydroxypropyl-2,2-dimethyl-3-propionate, diethyleneglycol, triethyleneglycol, tetraethyleneglycol, dipropyleneglycol, tripropyleneglycol, 1,4-cyclohexane dimethanol, 1,2-bis(hydroxymethyl)cyclohexane, 1,2-bis (hydroxyethyl)-cyclohexane, bis-hydroxypropylidantoines, tris-hydroxyethylisocyanurate, alkoxylation products of 2 moles of propylene oxide and 1 mole of bisphenol-A, and the like, for example ethoxylated or propoxylated trimethylol or pentaerythritol.

Polyester polyols are known products having a number average molecular weight of about 500 to about 10,000. Particularly suitable polyester polyols are polylactone diols such as polycaprolactone diols, polypropiolactone diols and polybutyrolactone diols.

Polyether polyols are also known compounds, which generally have a number average molecular weight of about 400 to about 10,000, such as polyoxyalkylene polyols, polyalkoxylated polyols, for example poly (oxytetramethylene)diols and mixtures thereof.

Amide group containing polyols, epoxypolyols, polyvinyl polyols, urethane polyols, polyacrylic polyols are disclosed in WO 98/37115, the entire contents of which are incorporated herein by reference, and are suitable for polymerization according to this invention.

The most preferred polyols are

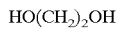  (IV),

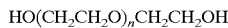  (V),

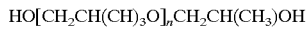  (VI),

  (VII), in which n is an integer of 1 to 2000 and $R^1$ and $R^2$ are divalent radicals such as alkylene radicals.

Other particularly suitable polyols include (a) esterification products of adipic acid with one or more diols selected from 1,4-butanediol, 1,6-hexanediol, neopentylglycol and 1,10-decanediol;

(b) reaction products of ε-caprolactone with one or more diols selected from 1,4-butanediol, 1,6-hexanediol, neopentylglycol and 1,10-decanediol;

(c) polytetramethyleneglycol;

(d) aliphatic polycarbonate glycols; and (e) mixtures of such polyols.

As is also well known in the art polythiourethanes are typically made by polymerizing a polyisocyanate or a mixture of polyisocyanates, such as those mentioned above, with one or more polythiols having two or more thiol functions, preferably two, three or four thiol functions.

The polythiol monomers can be represented by formula:

  (VIII)

In which n' is an integer from 2 to 6 and preferably 2 to 3, and R' is an organic group of valency equal to n'.

Useful polythiols are disclosed in EP-394 495 and in U.S. Pat. No. 4,775,733, the entire contents of each of which are incorporated herein by reference.

Among the suitable polythiol monomers there may be cited aliphatic polythiols such as pentaerythritol tetrakis mercaptopropionate, 1-(1'-mercaptoethylthio)2,3-dimercaptopropane, 1-(2'-mercaptopropylthio)-2,3-dimercaptopropane, 1-(3'-mercaptopropylthio)-2,3-dimercaptopropane, 1-(4'-mercaptobutylthio)-2,3-dimercaptopropane, 1-(5'-mercaptopentylthio)-2,3-dimercaptopropane, 1-(6'mercaptohexylthio)-2,3-dimercaptopropane, 1,2-bis(4'-mercaptobutylthio)-3-mercaptopropane, 1,2-bis(5'-mercaptopentylthio)-3-mercaptopropane, 1,2-bis(6'-mercaptohexylthio)-3-mercaptopropane, 1,2,3-tris(mercaptomethylthio)propane, 1,2,3-tris(3'-mercaptopropylthio)propane, 1,2,3-tris(2'-mercaptoethylthio)propane, 1,2,3-tris(4'-mercaptobutylthio)propane, 1,2,3-tris(6'-mercaptohexylthio)propane, 1,2-ethanedithiol, 1,1-propanedithiol, 1,2-propanedithiol, 1,3-propanedithiol, 2,2-propanedithiol, 1,6-hexanethiol-1,2,3-propanetrithiol, 1,2-bis(2'-mercaptoethylthio)-3-mercaptopropane, 1,2,3trimethylolpropane tri(thioglycolate), pentaerythritol tetra(thioglycolate), pentaerythritol tetra(3-mercaptopropionate), 1,2,3-trimethylolpropane tri(3-mercaptopropionate), thioglycerol, dithioglycerol, trithioglycerol, dipentaerythritol hexa(2-mercaptoacetate), and 3,4,5,6-tetrachloro-1,2-dimercapto benzene.

Particularly suitable polythiols are:

  (IX)

  (X)

  (XI).

The episulfide monomers for use in the process of the invention are compounds including at least two polymerizable functional groups, at least one of which is an episulfide functional group of formula:

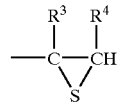  (XII)

in which $R^3$ and $R^4$ are, independently from each other, H, alkyl, aryl, alkoxy, aryloxy, alkylthio or arylthio. $R^3$ and $R^4$ can also represent a carbon-to-carbon bond.

The other polymerizable functional group can be an epoxy, thiol, ethylenic such as a vinyl, (meth)acrylate, carboxylic acid or anhydride, thiocarboxylic acid, thio alcohol, thiophenol, phenol, amine, or amide group. The preferred episulfide monomers are diepisulfides.

Suitable diepisulfide monomers are diepisulfides of formula

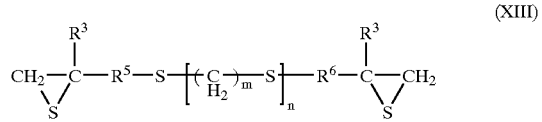  (XIII)

in which $R^3$ is defined as above; $R^5$ and $R^6$, independently from each other, represents

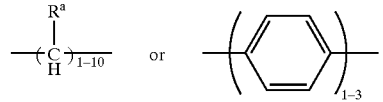

where $R^a$ designates H, alkyl, aryl, alkoxy, aryloxy, alkythio or arylthio acid, n is an integer from 0 to 4 and m is an integer from 0 to 6.

Particularly suitable diepisulfide monomers are those having at least one intramolecular disulfide bond.

A particularly suitable class of diepisulfide monomers is comprised of diepisulfide monomers of formula

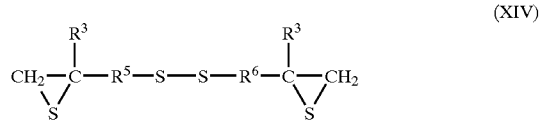  (XIV)

in which $R^3$, $R^5$ and $R^6$ are defined above.

In $R^3$, $R^4$, $R^5$, $R^6$ and $R^a$, the alkyl and alkoxy groups are preferably $C_1$-$C_6$ more preferably $C_1$-$C_4$ alkyl and alkoxy groups such methyl, ethyl, propyl, butyl, methoxy, ethoxy, propoxy and butoxy.

Specific examples of suitable diepisulfide monomers are bis(2,3-epithiopropyl)disulfide, bis(2,3-epithiopropyldithio) methane, bis(2,3-epithiopropyldithio)ethane, bis(6,7-epithio-3,4-dithioheptane)sulfide, 1,4-dithian-2,5-bis(2,3-epithiopropyldithiomethyl), 1,3-bis(2,3-epithiopropyldithiomethyl)benzene, 1,6-bis(2,3-epithiopropyldithio)-2-(2,3-epithiopropyldithioethylthio)-4-thiahexane and 1,2,3-tris(2,3-epithiopropyldithio)propane.

The preferred diepisulfide monomer is bis-2,3-(epithiopropyl)disulfide.

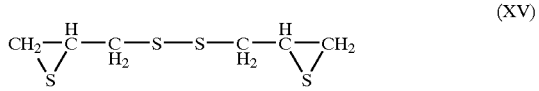

(XV)

The (meth)acrylate monomers for use in the process of the invention can be any (meth)acrylate classically employed for making organic glass articles such as optical articles, and in particular ophthalmic lenses.

Typical examples of (meth)acrylate monomers include ethylene glycol dimethacrylate, propylene glycol dimethacrylate, tetramethylene glycol dimethacrylate, polyethylene glycol dimethacrylate, trimethylolpropane triacrylate, pentaerythritolpropane trimethacrylate, ethoxylated bisphenol-A-diacrylate, 1,6-hexanediol dimethacrylate, urethane diacrylate and epoxy diacrylate.

A particularly suitable diacrylate monomer is the diacrylate of formula:

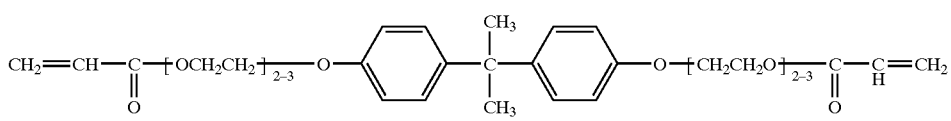

(XVI)

The process can be carried out by either dissolving the photoinitiator in neat monomer or in a solution of the monomer in an appropriate solvent or mixture of solvents.

The solvent or mixture of solvents used in the polymerization process of the present invention is preferably a solvent both for the monomers and the anionic photoinitiators and will depend upon the nature of the monomers and photoinitiators. Suitable solvents are diethylether, tetrahydrofuran, acetonitrile, ketones such as acetone, alcohols such as methanol and ethanol, N-methylpyrrolidone, dimethylsulfoxide and mixtures thereof. The preferred solvent is N-methyl pyrrolidone.

Any amount of anionic photoinitiator can be used that suitably initiates the desired polymerization or crosslinking reaction. An amount of photoinitiator in the formulation ranging from a few parts per million (ppm) to parts per hundred (pph) is typically suitable depending upon the system and desired applications. Preferably, the amount of photoinitiator will range from about 0.01 to about 0.5%, more preferably from about 0.05 to about 0.25% by weight, based on the total weight of the polymerization solution.

Irradiation of the solution is carried out using UV light (wavelength ranging from about 200 to about 400 nm).The wavelength of the UV light will depend on the specific photoinitiator used in the process in order to obtain a maximum light absorption by the photoinitiator.

In the following examples, unless otherwise stated, all parts and percentages are by weight.

EXAMPLE 1

Formation of Thiourethanes with Dithiocyanato Tetraamino Cobalt Tetraphenyl Borate, [Co(NH$_3$)$_4$(SCN)$_2$] BPh$_4$ A solution containing 41.13% diisocyanate of formula (I), 53.92% of polythiol of formula (IX) (equimolar in (I) and (IX)), 4.85% N-methyl pyrrolidone and 0.1% cobalt thiocyanate complex was subjected to UV radiation at an intensity of 100 mW/cm$^2$. The contents polymerized to give a solid in one minute.

EXAMPLE 2

Formation of Thiourethanes with Acetato Pentaamino Cobalt Tetraphenyl Borate, [Co(NH$_3$)$_5$(OAc)] [BPh$_4$]$_2$ A solution containing 41.13% (I), 53.92% (IX) (equimolar in (I) and (IX)), 4.85% N-methyl pyrrolidone and 0.1% cobalt acetate complex was subjected to UV radiation at an intensity of 100 mW/cm$^2$. The contents polymerized to give a solid in one minute.

EXAMPLE 3

Formation of Urethanes with Dithiocyanato Tetraamino Cobalt Tetraphenyl Borate, [Co(NH$_3$)$_4$(SCN)$_2$]BPh$_4$ A solution containing 60.67% (I), 31.99% 1,2-ethylenediol (IV) (equimolar in (I) and (IV)), 7.26% N-methyl pyrrolidone and 0.07% cobalt thiocyanate complex was subjected to UV radiation at an intensity of 100 mW/cm$^2$. The contents polymerized to give a solid in three minutes.

EXAMPLE 4

Formation of Urethanes with Acetato Pentaamino Cobalt Tetraphenyl Borate, [Co(NH$_3$)$_5$(OAc)][BPh$_4$]$_2$ A solution containing 60.67% (I) and 31.99% (IV) (equimolar in (I) and (IV)), 7.12% N-methyl pyrrolidone and 0.21% cobalt acetate complex was subjected to UV radiation at an intensity of 100 mW/cm$^2$. The contents polymerized to give a solid in one minute.

EXAMPLE 5

Formation of Urethanes with Dithiocyanato Tetraamino Cobalt Tetraphenyl Borate, (Co(NH$_3$)$_4$(SCN)$_2$]BPh$_4$ A solution containing 21.10% (I) and 76.35% of polyetherdiol of formula (VI) (equimolar in (I) and (VI)), 2.48% N-methyl pyrrolidone and 0.07% cobalt thiocyanate complex was subjected to UV radiation at an intensity of 100 mW/cm$^2$. The contents polymerized to give a highly viscous syrup in three minutes.

EXAMPLE 6

Formation of Urethanes with Acetato Pentaamino Cobalt Tetraphenyl Borate, [Co(NH$_3$)$_5$(OAc)][BPh$_4$]$_2$ A solution containing 21.10% (I) and 76.35% (VI) (equimolar in (I) and (VI)), 2.32% N-methyl pyrrolidone and 0.23% cobalt acetate complex was subjected to UV radiation at an intensity of 100 mW/cm$^2$. The contents polymerized to give a highly viscous syrup in three minutes.

EXAMPLE 7

Formation of Urethanes with Dithiocyanato Tetraamino Cobalt Tetraphenyl Borate, [Co(NH$_3$)$_4$(SCN)$_2$]BPh$_4$ A solution containing 22.12% (I) and 75.21% of polyetherdiol of formula (V) (equimolar in (I) and (V)), 2.60%

N-methyl pyrrolidone and 0.08% cobalt thiocyanate complex was subjected to UV radiation at an intensity of 100 mW/cm². The contents polymerized to give a highly viscous syrup in three minutes.

EXAMPLE 8

Formation of Urethanes with Acetato Pentaamino Cobalt Tetraphenyl Borate, [Co(NH$_3$)$_5$(OAc)][BPh$_4$]$_2$ A solution containing 22.12% (I) and 75.21% (V) (equimolar in (I) and (V)), 2.43% N-methyl pyrrolidone and 0.24% cobalt acetate complex was subjected to UV radiation at an intensity of 100 mW/cm². The contents polymerized to give a highly viscous syrup in three minutes.

EXAMPLE 9

Formation of Urethanes with Acetato Pentaamino Cobalt Tetraphenyl Borate, [Co(NH$_3$)$_5$(OAc)][BPh$_4$]$_2$ A solution containing 49.17% of dicyclohexylmethane diisocyanate (III), 25.83% of polyesterdiol of formula (VII) (polycaprolactone diol, Capa 304, Solvey, MW=240), 22.66% polycaprolactone triol (Capa 305, Solvey, MW=540), 2,09% N-methyl pyrrolidone and 0.25% cobalt acetate complex was subjected to UV radiation at an intensity of 100 mW/cm². The contents polymerized to give a clear gel in three minutes.

EXAMPLE 10

Polymerization of Cyanoethyl Acrylate with Dithiocyanato Tetraamino Cobalt Tetraphenyl Borate, [Co(NH$_3$)$_4$(SCN)$_2$]BPh$_4$.

A solution containing cyanoethyl acrylate and 0.19% cobalt thiocyanate complex was subjected to UV radiation at an intensity of 100 mW/cm². The contents polymerized to give a solid in one minute.

EXAMPLE 11

Polymerization of Cyanoethyl Acrylate with Acetato Pentaamino Cobalt Tetraphenyl Borate, [Co(NH$_3$)$_5$(OAc)][BPh$_4$]$_2$ A solution containing cyanoethyl acrylate and 1.0% cobalt acetate complex was subjected to UV radiation at an intensity of 100 mW/cm². The contents polymerized to give a solid in one minute.

EXAMPLE 12

Polymerization of Ethoxylated Bisphenol A Acrylate with Dithiocyanato Tetraamino Cobalt Tetraphenyl Borate, [Co(NH$_3$)$_4$(SCN)$_2$]BPh$_4$ A solution containing 92.17% ethoxylated bisphenol acrylate, 6.91% N-methyl pyrrolidone and 0.92% cobalt thiocyanate complex, [Co(NH$_3$)$_4$(SCN)$_2$] BPh$_4$, was subjected to UV radiation at an intensity of 100 mW/cm². The contents polymerized to give a solid in one minute.

EXAMPLE 13

Process for Making a Poly(urethane) Lens, with [Co(NH$_3$)$_5$(OAc)][BPh$_4$]$_2$ A solution containing 57.84% (I), 26.86% polycaprolactone triol (Capa 505, Solvey, MW=540), 14.53% butane diol, 0.78% acetonitrile and 0.29% cobalt acetate complex were mixed and degassed at 35° C. for 20 minutes. The solution was cast in 1 mm thick, 80 mm diameter taped lens mold assembly and subjected to five 60 second UV shots at an intensity of 100 mW/cm². [(On/off irradiation typically comprises irradiating the solution for 60 seconds with UV light, stopping irradiation for 1 minute and repeating this on/off cycle 5 times)]. The lens assembly was then placed in a hot air oven at 90° C. for 5 hours and the lens was demolded before cooling to room temperature.

EXAMPLE 14

Formation of Urethanes with [Mo(CO)$_5$(DABCO)]

A solution containing 25.81% poly(caprolactone diol)*, 22.61% poly(caprolactone triol) and 49.17% 4,4'-dicyclohexyl methane diisocyanate* (equimolar in diols and isocyanate), 2.04 N-methyl pyrrolidone and 0.24% Molybdenum initiator was subjected to UV radiation at an intensity of 200 mW/cm². The contents polymerized to give a gel in three minutes.

* CAPA 304 (MW=240) from Solvey
** CAPA 305 (MW=540) from Solvey
*** Desmadur W (MW=262) from Bayer

EXAMPLE 15

Polymerization of Episulfide X with [Mo(CO)$_5$(DABCO)].

A solution containing 90% of episulfide of formula (X), 9,75% tetrathiol**** and 0.50% molybdenum initiator was subjected to UV radiation at 150 mW/cm². The contents polymerized to give a solid in 3 minutes.

**** 2-(2-sulfanylethylthio)-3-[3-sulfanyl-2-(2-sulfanylethylthio)propylthio]propane-1-triol.

EXAMPLE 16

Synthesis of [Co(NH$_3$)$_4$(SCN)$_2$] [BPh$_4$]

A. Preparation of Crude [Co(NH$_3$)$_4$(NCS)$_2$]Cl

To an aqueous ammonia solution prepared by diluting 60 mL of 28–30% ammonium hydroxide (0.89 mol NH$_3$) with 540 mL of distilled water were added 228 g (3.0 mol) of NH$_4$NCS and 72 g (0.30 mol) CoCl$_2$.6H$_2$O. The resulting pink solution was bubbled with air at 40° C. for 6 h. Suction filtration of the reaction mixture yielded a red solid, which was washed 8 times with absolute ethanol, twice with acetone, and then dried by drawing air through the filter funnel (hereafter referred to as air-dried). Yield: 19 g.

B. Conversion to [Co(NH$_3$)$_4$(NCS)$_2$]NO$_3$

The crude product obtained by the procedure described above was a mixture of cis- and trans-[Co(NH$_3$)$_4$(NCS)$_2$]Cl and [Co(NH$_3$)$_5$(NCS)]C$_2$. Removal of the latter component was accomplished by fractional precipitation. Six grams of the crude material was added to 200 mL of 0.1 M acetic acid, and the resulting pink mixture stirred and heated to 80° C. to ensure complete dissolution. Adding 15 g of NaNO$_3$ in small portions to the hot, stirred solution caused the precipitation of an orange-pink material that was mainly [Co(NH$_3$)$_5$(NCS)](NO$_3$)$_2$ mixed with a small amount of [Co(NH$_3$)$_4$(NCS)$_2$]NO$_3$. Stirring was continued for 3 min following the last addition of NaNO$_3$, and then the mixture was suction filtered. The filtrate was cooled to room temperature and concentrated to a volume of about 30 mL with a rotary evaporator. Pink crystals of [Co(NH$_3$)$_4$(NCS)$_2$]NO$_3$ were collected by suction filtration, washed with two 10 mL volumes of distilled water and four 10 mL volumes of absolute ethanol, and air-dried. Yield: 1.1 g. Anal. Calc'd for $C_2H_{12N7}O_3S_2Co$: C, 7.87; H, 3.96; N 32.13. Found: C, 7.78; H, 3.97; N, 31.89.

The composition of this material was examined by ion-exchange chromatography on an 11-mm i.d. column packed to a height of 105 mm with a Sephadex resin (SP, C-25-120). Elution with a 0.05 M aqueous solution of NaCl revealed two components, a fast moving pink band assigned to trans[$Co(NH_3)_4(NCS)_2$]$NO_3$ and a slow moving orange band attributable to the corresponding cis isomer. While no quantitative determination of the relative amounts of each isomer was made, we visually estimated that the trans/cis ratio exceeds unity.

C. Conversion to [$Co(NH_3)_4(NCS)_2$]$BPh_4$

All operations were performed under yellow light. Fifty milliliters of an aqueous solution containing 2.46 g (7.2 mmol) of $NaBPh_4$ were added dropwise to 400 mL of a stirred aqueous solution containing 1.83 g (6.0 mmol) of [$Co(NH_3)_4(NCS)_2$]$NO_3$. The resulting mixture was stirred for another 20 min and a tan precipitate collected by suction filtration. The solid was washed with two 20 mL volumes of 0.01 M aqueous $NaBPh_4$, three 20 mL volumes of distilled water, and then air-dried. Yield: 2.8 g. Anal. Calc'd for $C_{26}H_{32}N_6BS_2Co$: C, 55.52; H, 5.74; N, 14.94. Found: C, 55.37; H, 5.72; N, 14.97.

D. Electronic Absorption Spectroscopy

FIG. 1 shows the room-temperature electronic absorption spectra of [$Co(NH_3)_4(NCS)_2$]$_+$ in several solvents, while Table 1 summarizes peak maxima and extinction coefficient data. Since cis and trans isomers are present in solution, both contribute to the measured composite spectrum. For a given solvent, the spectrum contains an intense band between 320–400 nm and a weaker band above 500 nm. Interestingly, both bands, but particularly the one in the near ultraviolet region, are sensitive to solvent, undergoing a shift to shorter wavelengths in more polar media. This solvatochromic behavior indicates that the complex undergoes a change in dipole moment upon photoexcitation.

solution of 0.66 g (7.3 mmol) of $NaClO_2$ was added dropwise. Stirring for an additional 30 min yielded a black mixture. At this point 3.00 g (37.0 mmol) of NaNCS dissolved in 40 mL of distilled water was added dropwise with stirring at room temperature. Continued stirring of the reaction mixture overnight at 0° C. afforded a yellow-green solid. This material was collected by suction filtration, washed with five 20 mL volumes of distilled water, and air-dried. Yield: 2.65 g. Anal. Calc'd for $C_{23}H_{20}N_7S_3Co$: C, 50.27; H, 3.64. Found: C, 50.52; H, 3.90. Thin layer chromatography on silica gel revealed that the product consisted of at least two components, presumably the trans/cis isomeric pair, although the presence of a small amount of [$Co(py)_5NCS$]($NCS$)$_2$ cannot be discounted.

B. Conversion to [$Co(Py)_4(NCS)_2$]$BPh_4$

All operations were conducted under yellow light. Two solutions were prepared as follows: (1) 1.0 g (2.9 mmol) of $NaBPh_4$ was dissolved in 7 mL of a methanol/distilled water (5.5/1.5) solvent mixture; (2) 0.54 g (1.0 mmol) of [$Co(py)_4(NCS)_2$]NCS was dissolved in 30 mL of methanol. Solution 1 was added dropwise to the vigorously stirred solution 2 at 0° C., and the stirring was continued for an additional 30 min to yield a tan solid. The volume of liquid in the reaction mixture was reduced to 15 mL on a rotary evaporator, and then 25 mL of distilled water was added. The resulting mixture was stirred for 30 min and placed in a freezer at around −15° C. overnight. The precipitate was collected by suction filtration, washed with two 30 mL volumes of 0.01 M aqueous $NaBPh_4$, five 30 mL volumes of distilled water, and air-dried. Yield: 0.23 g.

C. Electronic Absorption Spectroscopy

Figure 2:
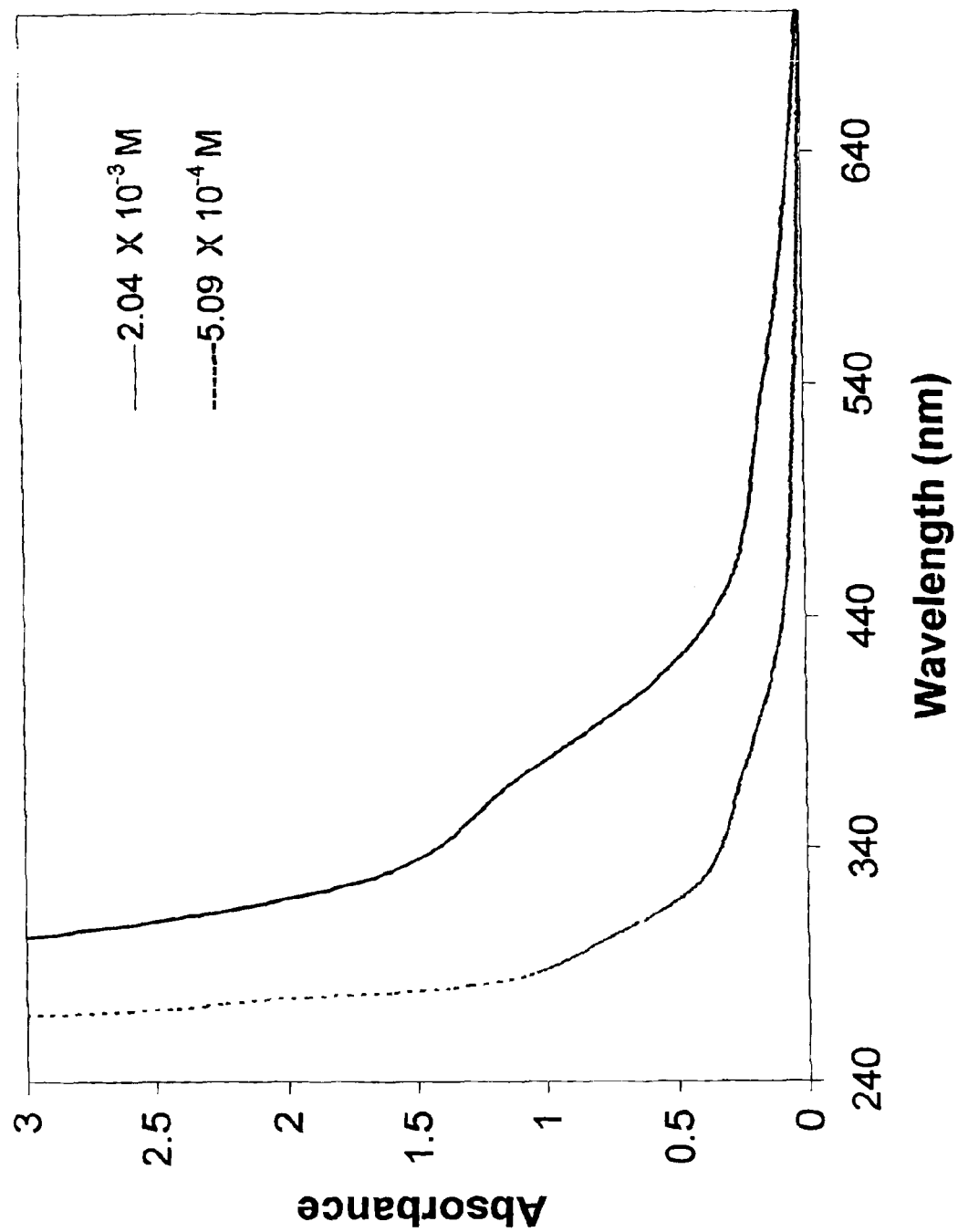
FIG. 2 is a graph showing the electronic absorption spectrum of $[Co(Py)_4(NCS)_2]BPh4$ at two concentrations in room-temperature methanol.

FIG. 2 shows the electronic absorption spectrum of [$Co(py)_4(NCS)_2$]$BPh_4$ at two concentrations in room-temperature methanol. Although distinct band maxima are absent, shoulders at around 390 and around 500 nm are evident. Preliminary experiments indicate that the spectrum is sensitive to changes in solvent polarity.

EXAMPLE 18

Synthesis of [$Co(NH_3)_5(CH_3COO)$][$BPh_4$]$_2$

A. Preparation of [$Co(NH_3)_5CO_3$]$NO_3$

TABLE 1

Electronic Absorption Spectral Parameters for [$Co(NH_3)_4(NCS)_2$]$^+$ Salts in Different Solvents.

| Sample | Solvent | $\lambda_1$(max) (nm) | $\epsilon_1$ ($M^{-1}\cdot cm^{-1}$) | $\lambda_2$(max) (nm) | $\epsilon_2$ ($M^{-1}\cdot cm^{-1}$) | Ratio of $\epsilon_1/\epsilon_2$ |
|---|---|---|---|---|---|---|
| 0.636 mM Nitrate Salt | Water | 320.0 | 2865 | 520.0 | 287 | 10.0 |
| 0.647 mM BPh4 Salt | $H_2O$:$CH_3CN$ 6:4(V/V) | 328.9 | 2940 | 525.5 | 296 | 9.93 |
| 0.658 mM BPh4 Salt | $CH_3CN$ | 348.3 | 3190 | 533.9 | 380 | 8.39 |
| 0.651 mM BPh4 Salt | $CH_3CN$:$CCl_2H_2$ 25:75(V/V) | 359.5 | 3290 | 537.7 | 431 | 7.63 |

EXAMPLE 17

Synthesis of [$Co(py)_4(SCN)_2$][$BPh_4$]

A. Preparation of [$Co(Py)_4(NCS)_2$]NCS

To a solution of 5.0 mL (62 mmol) of pyridine dissolved in 60 mL of distilled water was added 3.66 g (12.6 mmol) of $Co(NO_3)_2$ $6H_2O$. The resulting reddish brown solution was stirred vigorously at 0° C. while 20 mL of an aqueous A solution of 300 g of cobalt(II) nitrate 6-hydrate (1.03 mol) in 150 mL of distilled water was thoroughly mixed with a solution of 450 g of ammonium carbonate (4.68 mol) in 450 mL of distilled water and 750 mL of 28–30% aqueous ammonium hydroxide (11.1 mol $NH_3$). A stream of air was bubbled slowly through the mixture for 24 h. After the mixture had cooled in an ice-salt bath overnight, the product was collected on a filter, washed with 50 mL of ice-cold water, followed by ethanol and diethyl ether, and then dried by drawing air through the filter funnel. Yield: 180 g.

This crude material was purified by recrystallization from water. The solid was dissolved with stirring in 550 mL of water at 90° C., the resulting solution filtered, and the filtrate cooled in an ice-salt bath. Crystals of the product were collected on a filter, washed with 50 mL of ice cold water, followed by ethanol and diethyl ether, and air dried. Yield: 110 g.

B. Preparation of $[Co(NH_3)_5(CH_3COO)](NO_3)_2$

To 5.0 g of $[Co(NH_3)_5CO_3]NO_3$ (0.019 mol) suspended in 15 mL of distilled water was added 12 g of glacial acetic acid (0.20 mol). The reaction mixture was concentrated on a water bath for 1.5 h during which time a red crystalline salt separated. After cooling to room temperature, 50 mL of distilled water was added, and the product was collected on a filter. After removing the mother liquor from the filter flask, the solid was washed with 50 mL of cold water, followed by ethanol and diethyl ether, and air dried. Yield: 2.2 g. Anal. Calc'd for $C_2H_{18}N_7O_8Co$: C, 7.34; H, 5.56; N, 29.97. Found: C, 7.41; H, 5.67; N, 30.22.

An additional 2.1 g of the cobalt complex was obtained by adding 15 g of ammonium nitrate (0.19 mol) to the mother liquor. The precipitated salt was collected, washed, and dried as described above.

C. Conversion to $[Co(NH_3)_5(CH_3COO)](BPh_4)_2 \cdot H_2O$

One hundred milliliters of an aqueous solution containing 5.0 g (1.5 mmol) of $NaBPh_4$ was added dropwise to 400 mL of a stirred aqueous solution containing 2.0 g (6.1 mmol) of $[Co(NH_3)_5(CH_3COO)](NO_3)_2$. The resulting mixture was stirred for 20 min and a tan precipitate collected by suction filtration. The solid was washed with 100 mL of 0.01 M aqueous $NaBPh_4$, 80 mL of distilled water, and then air dried. Yield: 1.0 g. Anal. Calc'd for $C_{50}H_{60}N_5O_3B_2C$: C, 69.85; H, 7.05; N, 8.15. Found: C, 69.18; H, 7.05; N, 7.91.

EXAMPLE 19

Synthesis of $[Mo(CO)_5(DABCO)]$

A. Synthesis and Characterization of $Mo(CO)_5(DABCO)$

A colorless solution of 0.810 g (3.07 mmol) of $Mo(CO)_6$ in 80 mL of THF was purged with argon for 30 min and then irradiated, under continuous argon purge, for 3 h with the Pyrex-filtered output of a 200-W high-pressure mercury lamp. To the yellow photolyte was added 15 mL of THF containing 0.345 g (3.08 mmol) of DABCO. After 2 h, the solvent was removed by rotary evaporation (in dim light) to afford a solid, which was redissolved in a minimum volume (around 2 ml) of benzene and chromatographed on a 4-in column packed with neutral alumina. Unreacted $Mo(CO)_6$ was removed by elution with isooctane, while $Mo(CO)_5$(DABCO) was eluted with benzene. Rotary evaporation of the benzene eluate yielded a yellow solid, which was washed with 30 mL of distilled water to remove free DABCO. Yield: 0.12 g (9%). Anal. Calc'd for $C_{22}H_{12}N_2O_5Mo$: C, 37.93; H, 3.48; N, 8.04. Found: C, 38.03; H 3.45; N, 7.94.

Figure 3:
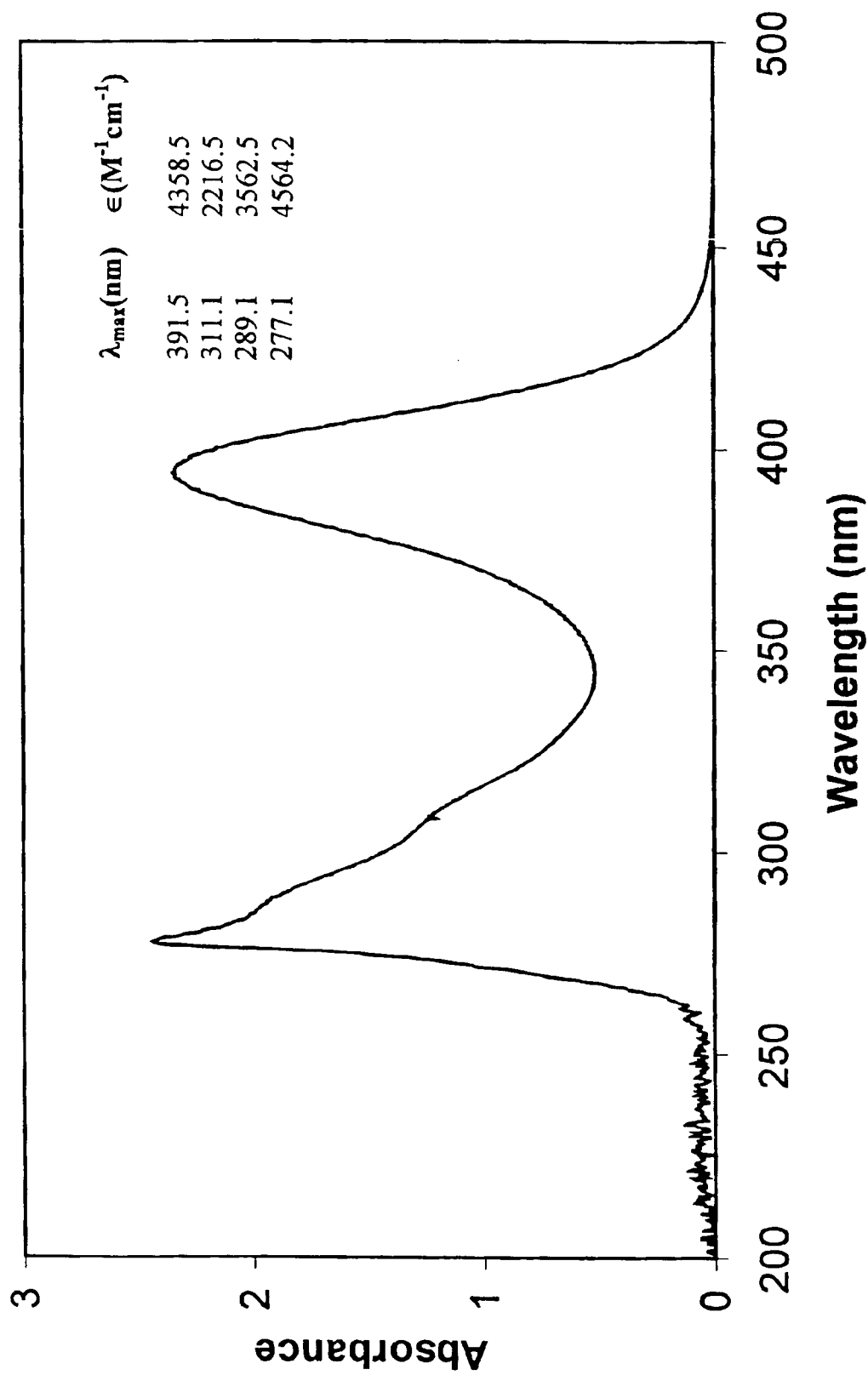
FIG. 3 is a graph showing the electronic absorption spectrum of $Mo(CO)_5(DABCO)$ in room-temperature benzene.

FIG. 3 shows the electronic absorption spectrum of $Mo(CO)_5(DABCO)$ in room-temperature benzene, while Table 1 summarizes peak maxima and extinction coefficient data for this complex and $Mo(CO)_6$. The intense band at 392 nm in the spectrum of the DABCO complex makes this a particularly attractive photoinitiator.

TABLE 2

Electronic Absorption Spectral Data for
$Mo(CO)_6$ and $Mo(CO)_5(DABCO)$ in Benzene

| $Mo(CO)_6$ | | $Mo(CO)_5(DABCO)$ | |
|---|---|---|---|
| $\lambda_{max}$ (nm) | $\epsilon_{max}$ (M$^{-1}$cm$^{-1}$) | $\lambda_{max}$ (nm) | $\epsilon_{max}$ (M$^{-1}$cm$^{-1}$) |
| 331 | 2049 | 392 | 4358 |
| 312 | 3533 | 311 | 2216 |
| 290 | 17420 | 289 | 3562 |

EXAMPLE 20

Sythesis of $W(CO)_5(DABCO)$, $W(CO)_5$(pyrrolidine), and $W(CO)_5(DMCA)$

A. Synthesis and Characterization of $W(CO)_5$(pyrrolidine)

A solution of 0.230 g (0.653 mmol) of $W(CO)_6$ in 20 mL of THF was purged with argon for 30 min and then irradiated, under continuous argon purge, for 2 h with the Pyrex-filtered output of a 200W high-pressure mercury lamp. To the yellow photolyte was added 0.233 g (3.28 mmol) of pyrrolidine, and the resulting mixture was allowed to react in the dark under argon purging for 1.5 h. Thereafter, the solvent was removed by rotary evaporation at 35° C. to afford a yellow solid, which was redissolved in a minimum volume of isooctane and chromatographed on a column (i.d.=0.44 inch) packed with 7 inches of neutral alumina. Unreacted $W(CO)_6$ was removed by elution with 150 mL of isooctane, while $W(CO)_5$(pyrrolidine) was eluted with benzene. Rotary evaporation of the benzene eluate at 35° C. yielded a bright yellow oil, which solidified after standing for one day. The solid was dissolved in 12 mL of isooctane at 35° C. and placed in a refrigerator for 12 h. Yellow crystals of the desired product were collected by filtration and dried in vacuum. Yield: 0.125 g (48%). Anal. Calc'd for $C_9H_9NO_5W$: C, 27.36; H, 2.28; N, 3.54. Found: C, 27.68; H, 2.33; N, 3.63.

Figure 4:
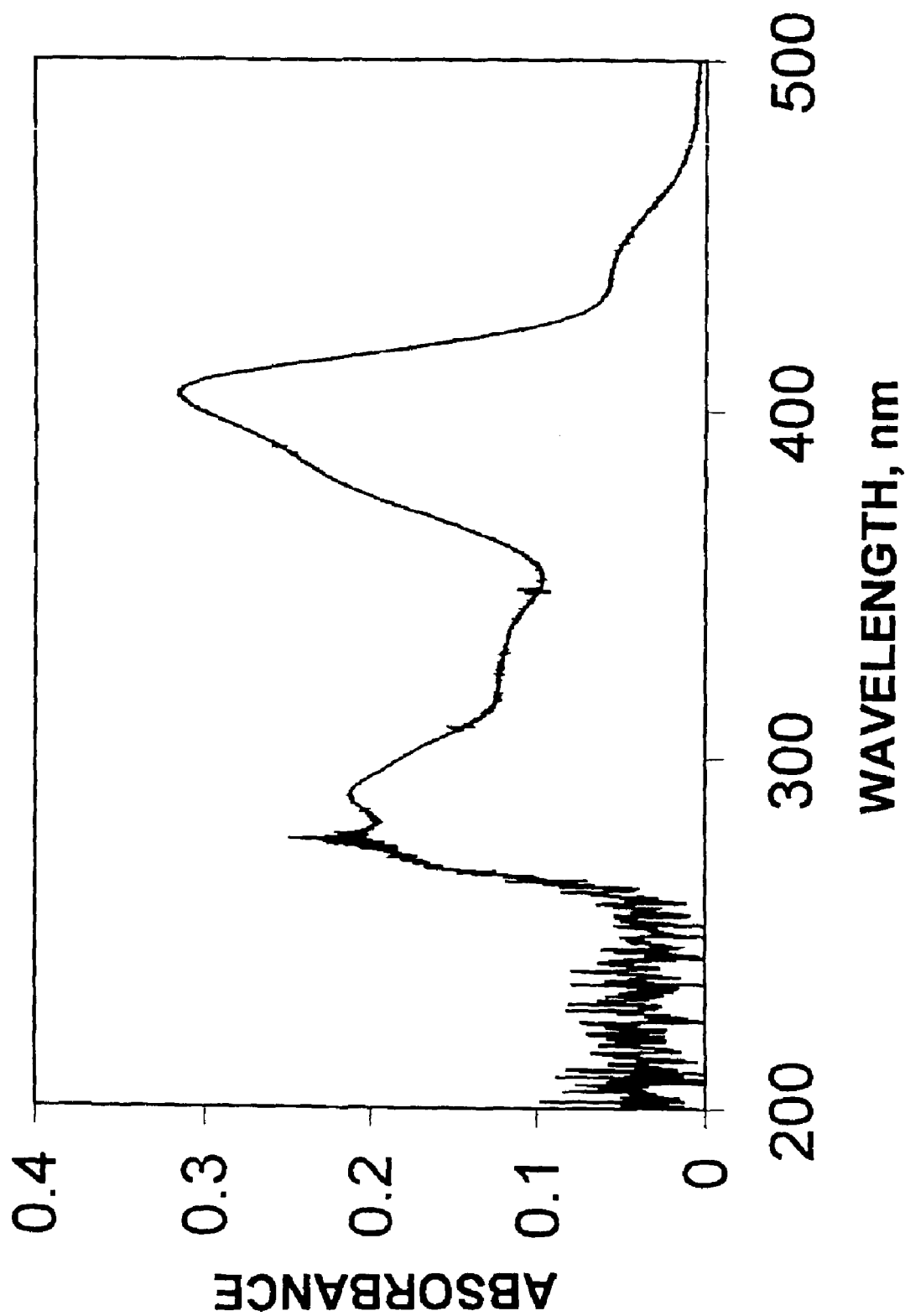
FIG. 4 is a graph showing the electronic absorption spectrum of $W(CO)_5(pyrrolidine)$ in room-temperature benzene.

FIG. 4 shows the electronic absorption spectrum of $W(CO)_5$(pyrrolidine) in room-temperature benzene, while Table 3 summarizes peak maxima and extinction coefficient data for this and the other amine complexes described below.

B. Synthesis and Characterization of $W(CO)_5(DMCA)$

A solution containing 0.705 g (2.00 mmol) of $W(CO)_6$ and 2.50 g (19.6 mmol) of dimethylcyclohexylamine (DMCA) in 90 mL of isooctane was purged with argon for 30 min and then irradiated, under continuous argon purge, for 1 h with the Pyrex-filtered output of a 200-W high-pressure mercury lamp. Solvent was removed from the yellow photolyte by rotary evaporation at 40° C., and unreacted amine and $W(CO)_6$ were volatilized away by placing the sample under high vacuum at 35° C. for 4 h. The resulting yellow solid was dissolved in isooctane and this solution loaded onto a column packed with 8 inches of neutral alumina. Isooctane was used as the eluting solvent; the first 30 mL of eluant were colorless and discarded, after which a yellow fraction containing the desired complex was collected. Removal of solvent by rotary evaporation at 40° C. afforded a yellow solid, which was kept under high vacuum at 35° C. for 4 h to remove residual amine and $W(CO)_6$. Finally, the solid was washed with a water/methanol (1:1 v/v) mixture to remove any remaining trace of amine, and then vacuum dried. Yield: 0.080 g (8.8%). Anal. Calc'd for $C_{13}H_{17}NO_5W$: C, 34.60; H, 3.77; N, 3.10. Found: C, 34.39; H, 3.77; N, 3.07.

Figure 5:
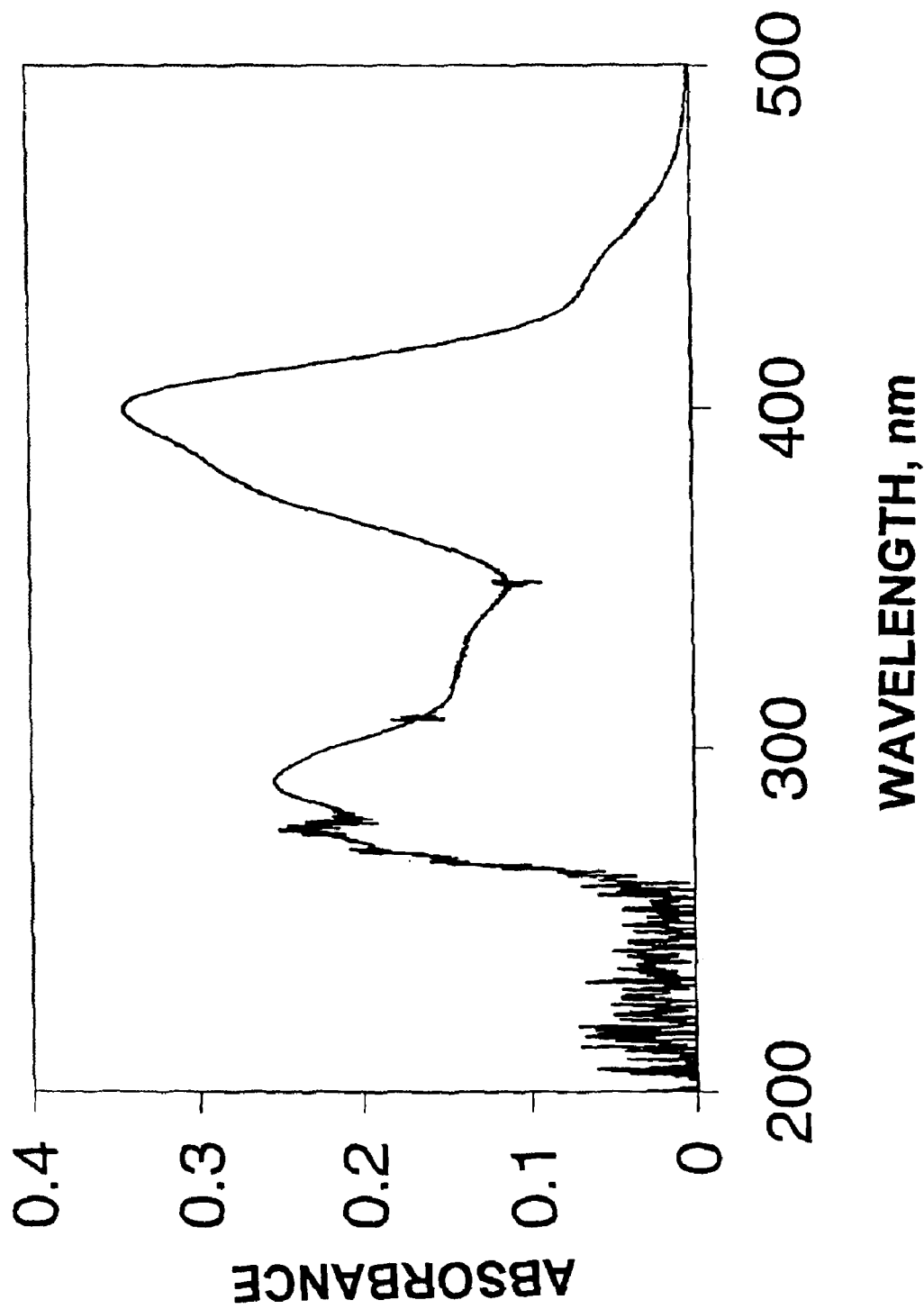
FIG. 5 is a graph showing the electronic absorption spectrum of $W(CO)_5(DMCA)$ in room-temperature benzene.

FIG. 5 shows the electronic absorption spectrum of W(CO)$_5$(DMCA) in room-temperature benzene, while Table 3 summarizes peak maxima and extinction coefficient data.

C. Synthesis and Characterization of W(CO)$_5$(DABCO)

A solution containing 0.842 g (2.39 mmol) of W(CO)$_6$ in 90 mL of THF was purged with argon for 30 min and then irradiated, under continuous argon purge, for 2 h with the Pyrex-filtered output of a 200 W high-pressure mercury lamp. To the yellow photolyte was added 20 mL of THF containing 1.34 g (12.0 mmol) of DABCO, and the resulting solution was allowed to react in the dark for 2 h under an argon purge. Solvent was removed by rotary evaporation at 40° C., the resulting yellow solid was dissolved in isooctane, and this solution was chromatographed on a column packed with 8 inches of neutral alumina. Unreacted W(CO)$_6$ was eluted with 150 mL of isooctane, while W(CO)$_5$(DABCO) was eluted with benzene. Removal of benzene by rotary evaporation yielded a yellow solid, which was placed in high vacuum at 30° C. for 2 h. The solid was washed with distilled water to remove free DABCO and then vacuum dried. Yield: 0.436 g (43%). Anal. Calc'd for C$_{11}$H$_{12}$N$_2$O$_5$W: C, 30.29; H, 2.77; N, 6.42. Found: C, 30.53; H, 2.82; N, 6.47.

Figure 6:
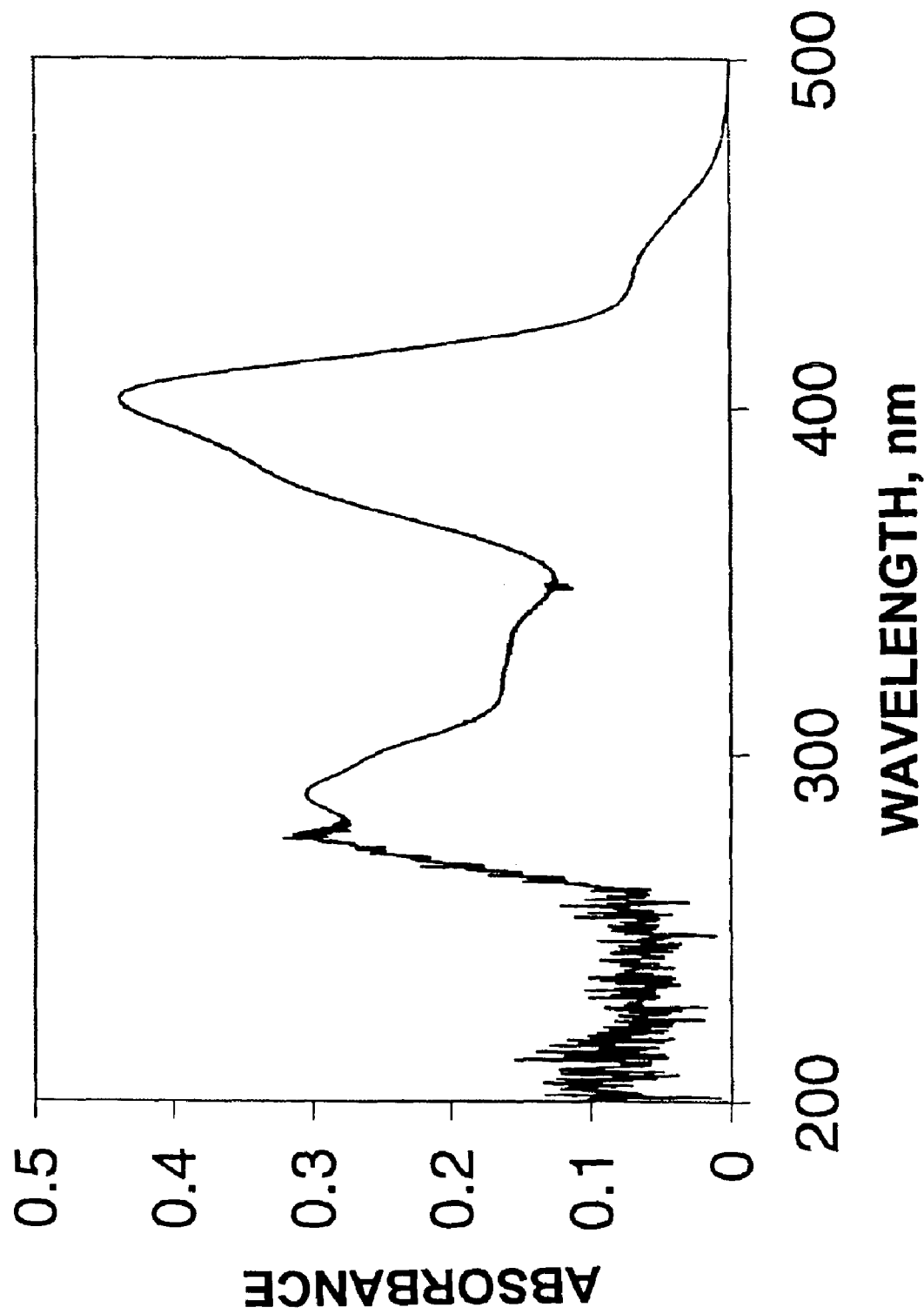
FIG. 6 is a graph showing the electronic absorption spectrum of $W(CO)_5(DABCO)$ in room-temperature benzene.

FIG. 6 shows the electronic absorption spectrum of W(CO)$_5$(DABCO) in room-temperature benzene, while Table 3 summarizes peak maxima and extinction coefficient data.

TABLE 3

Electronic Absorption Spectral Data for
W(CO)$_5$(amine) Complexes in Room-temperature Benzene

| W(CO)$_5$(pyrrolidine) | | W(CO)$_5$(DABCO) | | W(CO)$_5$(DMCA) | |
|---|---|---|---|---|---|
| $\lambda_{max}$ (nm) | $\epsilon_{max}$ (M$^{-1}$cm$^{-1}$) | $\lambda_{max}$ | $\epsilon_{max}$ (M$^{-1}$cm$^{-1}$) | $\lambda_{max}$ (nm) | $\epsilon_{max}$ (M$^{-1}$cm$^{-1}$) |
| 444 | 651 | 444 | 515 | 444 | 535 |
| 401 | 3840 | 400 | 3570 | 399 | 3520 |
| 378 | 2630 | 377 | 2560 | 377 | 2770 |
| 332 | 1460 | 333 | 1300 | 332 | 1380 |
| 322 | 1500 | 321 | 1360 | 320 | 1460 |
| 300 | 2200 | 300 | 2120 | 300 | 2630 |
| 287 | 2600 | 287 | 2490 | 287 | 2550 |

We tested the thermal stability of W(CO)$_5$(pyrrolidine), W(CO)$_5$(DABCO), and W(CO)$_5$(DMCA) in the presence of thiols. A 1–2 mg sample of each complex was dissolved in 2 mL of acetonitrile to afford light-yellow solutions. These solutions were added to 1 mL of each thiol. The light yellow color of the resulting mixtures persisted for at least two days, suggesting that the tungsten complexes are reasonably stable in a thiol-rich environment.

EXAMPLE 21

Polymerization of Ethyl-2-cyanoacrylate with W(CO)$_5$(pyrrolidine)

A 5 mg sample of W(CO)$_5$(pyrrolidine) was dissolved in 20 ml of ethyl α-cyanoacrylate (CA). A disposable dark plastic bottle that allows no light to pass through it was used to contain the solution. The solution was left overnight at room temperature to test thermal stability. No significant changes occurred and a fresh solution of the same concentration was prepared. A small aliquot of the solution was placed in a 1 cm plastic cell with a small magnetic stirrer. The cell was placed in the cell holder on a stir plate. Four samples were irradiated, three at 405 nm and the fourth in white light. The polymerization time for each sample is listed in Table 4. Polymerization time is defined as the time required for the solution to become so viscous that a magnetic stirrer inside the reaction cell stops spinning.

TABLE 4

Polymerization Test

| Trial | Wavelength, λ, nm | Polymerization Time (s) |
|---|---|---|
| 1 | 405 | 114.8 |
| 2 | 405 | 120.2 |
| 3 | 405 | 114.6 |
| 14 | λ > 290 | 66.9 |

EXAMPLE 22

Quantum yield of base for W(CO)$_5$(DABCO), W(CO)$_5$(pyrrolidine), and W(CO)$_5$(DMCA)

The yield of base release, $\Phi_{base}$, was investigated for the tungsten complexes W(CO)$_5$(DABCO), W(CO)$_5$(pyrrolidine), and W(CO)$_5$(DMCA) in isooctane or benzene solutions containing 0.1 molar triphenylphosphine (PPh$_3$) as a scavenger for the metal-containing photoproduct in accordance with the equation

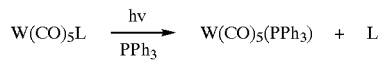

where L is DABCO, DMCA, or pyrrolidine. The values of $\Phi_{base}$ determined fell in the range of 0.4–0.5, confirming that the complexes are excellent sources of photogenerated base.

What is claimed is:

1. A process for polymerizing a monomer, polymerizing and/or crosslinking an oligomer, or crosslinking a polymer or copolymer, said monomer, oligomer, polymer and copolymer being selected from the group consisting of precursor monomers of the polymer or copolymer, urethane oligomers, thiourethane oligomers, episulfide oligomers, urethane polymers and copolymers, thiourethane polymers and copolymers, and episulfide polymers and copolymers, which comprises:

(a) adding to precursor monomers or oligomers or polymers or copolymers an effective amount of at least one complex of Co, Mo or W which under irradiation conditions photochemically reacts to release at least one anionically charged nucleophile or uncharged Lewis base; and (b) irradiating the mixture of (a) to release the at least one anionically charged nucleophile or uncharged Lewis base to initiate polymerisation and/or crosslinking of the monomer, oligomer, polymer or copolymer;

wherein the complex excludes trans-Co(en)$_2$Cl$_2^+$ and trans-Co(cyclam)Cl$_2^+$.

2. The process of claim 1, wherein the released anionically charged nucleophile is selected from the group consisting of a thiocyanate, acetate, benzoate, thiolate, alkoxylate anion or a mixture thereof.

3. The process of claim 1, wherein the complex is selected from the group consisting of:

[Co(NH$_3$)$_4$(SCN)$_2$] [BPh$_4$]
[Co(en)$_2$(SCN)$_2$] [BPh$_4$]
[Co(Py)$_4$(SCN)$_2$] [BPh$_4$]

[Co(NH$_3$)$_2$(SCN)$_4$] [K]
[Co(NH$_3$)$_5$(CH$_3$COO)] [BPh$_4$]$_2$
[Co(NH$_3$)$_4$(CH$_3$COO)$_4$] [BPh$_4$]
[Co(NH$_3$)$_5$(C$_6$H$_5$COO)] [BPh$_4$]$_2$
[Co(NH$_3$)$_4$(C$_6$H$_5$COO)$_2$] [BPh$_4$]
[Co(NH$_3$)$_5$(SR)] [BPh$_4$]$_2$
[Co(NH$_3$)$_4$(SR)$_2$] [BPh$_4$]
[Co(NH$_3$)$_5$(OR)] [BPh$_4$]$_2$
[Co(NH$_3$)$_4$(OR)$_2$] [BPh$_4$] and
[Mo(CO)$_5$(1,2-diazabicyclo[2,2,2]octane)], where R is an alkyl group.

4. The process of claim 1, wherein the mixture is irradiated with UV light.

5. The process of claim 1, wherein said polymerization or crosslinking occurs at a temperature from about 20° C. to about 30° C.

* * * * *